(12) United States Patent (10) Patent No.: US 12,694,555 B2

Jin et al. (45) Date of Patent: Jul. 28, 2026

(54) SYSTEM AND METHOD FOR SPATIAL ANALYSIS OF LEAF IMAGES

(71) Applicant: Purdue Research Foundation, West Lafayette, IN (US)

(72) Inventors: Jian Jin, West Lafayette, IN (US); Zhihang Song, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 308 days.

(21) Appl. No.: 18/542,709

(22) Filed: Dec. 17, 2023

(65) Prior Publication Data

US 2024/0212188 A1 Jun. 27, 2024

Related U.S. Application Data

(60) Provisional application No. 63/433,255, filed on Dec. 16, 2022.

(51) Int. Cl.
*G06K 9/00* (2022.01)
*G01K 1/143* (2021.01)
*G06T 7/64* (2017.01)

(52) U.S. Cl.
CPC .............. *G06T 7/64* (2017.01); *G01K 1/143* (2013.01); *G06T 2207/30188* (2013.01)

(58) Field of Classification Search
CPC . G06T 2207/30188; G06T 7/64; G01K 1/143; G01K 7/30; G01K 13/20; A61B 5/01
See application file for complete search history.

(56) References Cited

U.S. PATENT DOCUMENTS

| | | | | |
|---|---|---|---|---|
| 7,767,801 B2 * | 8/2010 | Hehl | .................. | C12N 15/8222 |
| | | | | 435/320.1 |
| 10,767,188 B2 * | 9/2020 | Mackenzie | ........ | C12N 15/8269 |
| 12,119,086 B2 * | 10/2024 | Bauer | .................... | G01N 21/31 |
| 12,361,501 B2 * | 7/2025 | Sadeh | .................... | G06Q 10/04 |

(Continued)

OTHER PUBLICATIONS

Hacker et al ("Evaluating the spatial distribution of plant function in a prairie-oak savanna using spectroscopy", The University of Vancouver, Aug. 2022). (Year: 2022).*

(Continued)

*Primary Examiner* — Shervin K Nakhjavan

(74) *Attorney, Agent, or Firm* — Piroozi-IP, LLC

(57) ABSTRACT

A method for spatial analysis of leaf images is disclosed which includes acquiring one or more leaf images of plants, generating 3-dimensional (3D) images from the acquired one or more images from spectral heatmaps, identifying a stem and a plurality of veins, identifying i) one or more of valleys and ridges as regions between two consecutive veins from the plurality of veins, or ii) one or more of peaks and valleys as regions between two consecutive veins from the plurality of veins in the one or more generated 3D images, calculating average slopes in the generated 3D images between i) one or more of peak-to-valley, or ii) ridge-to-valley for the veins, calculating a nitrogen index based on the calculated average slopes, if the calculated average slope is between two thresholds, communicate to a user to add a predetermined chemical to the plants.

19 Claims, 18 Drawing Sheets
(14 of 18 Drawing Sheet(s) Filed in Color)

(56)     References Cited

U.S. PATENT DOCUMENTS

| | | | |
|---|---|---|---|
| 12,378,568 B2 * | 8/2025 | Mukherjee | C12N 15/8269 |
| 12,417,532 B2 * | 9/2025 | Estrada | H04N 7/181 |
| 2023/0079259 A1 * | 3/2023 | Deljkovic | G03B 15/05 |
| | | | 382/110 |
| 2023/0384231 A1 * | 11/2023 | He | G01N 33/0098 |

OTHER PUBLICATIONS

Zakari et al ("Nitrogen deficiency regulates premature senescence by modulating flag leaf function, ROS homeostasis, and intercellular sugar concentration in rice during grain filling", Journal of Genetic Engineering and Biotechnology, 2021). (Year: 2021).*
Ji-Yong et al., 2012, Nondestructive diagnostics of nitrogen deficiency by cucumber leaf chlorophyll distribution map based on near infrared hyperspectral imaging. Sci Hortic 138, 190-197.
Ma et al., 2020, Stress Distribution Analysis on Hyperspectral Corn Leaf Images for Improved Phenotyping Quality. Sensors 2020, vol. 20, p. 3659 20, 3659.
Sack et al., 2013, Leaf venation: Structure, function, development, evolution, ecology and applications in the past, present and future. New Phytologist 198, 983-1000.
Tegeder et al., 2018, Source and sink mechanisms of nitrogen transport and use. New Phytologist 217, 35-53.
Wang et al., 2020, LeafSpec: An accurate and portable hyperspectral corn leaf imager. Comput Electron Agric 169, 105209.

* cited by examiner

LSS

Rectangle detection

Aspect ratio calibration

Axis M

Axis V

Axis D

Pixel X

Distance along Axis M

Distance along Axis V

Shortest distance to an Axis V

Distance to another Axis V

DROUGHT-STRESSED PIONEER

Avg. NDVI

NLCS-N

WELL-WATERED PIONEER

WELL-WATERED THORNE

SYSTEM AND METHOD FOR SPATIAL ANALYSIS OF LEAF IMAGES

CROSS-REFERENCE TO RELATED APPLICATIONS

This patent application claims priority to a U.S. provisional patent application Ser. 63/433,255 filed Dec. 16, 2022, contents of which are incorporated by reference in its entirety into the present disclosure.

STATEMENT REGARDING GOVERNMENT FUNDING

None.

TECHNICAL FIELD

The present disclosure generally relates to plant phenotypic systems, and in particular to a leaf imaging system capable of spatial analysis of hyperspectral leaf images.

BACKGROUND

This section introduces aspects that may help facilitate a better understanding of the disclosure. Accordingly, these statements are to be read in this light and are not to be understood as admissions about what is or is not prior art.

Hyperspectral imaging (HSI) technology has been increasingly applied in plant phenotyping to measure plant traits such as biomass, water, nutrients, and also how a plant responses to abiotic and biotic stresses. However, most current HSI systems are expensive, and their signal quality is compromised by various noise factors, such as changing ambient light, leaf position and specifically leaf slope within the imaging chamber, and so on. To overcome these challenges, some newly developed proximal imaging systems could provide a much higher resolution of plant tissues than before with exclusive details, making it possible to elevate the quality of plant phenotyping. For example, Inventors of the present disclosure have invented several such systems including those described in U.S. Pat. No. 11,536,663 to Jin et al., U.S. Prov. App. No. 63/423,771, U.S. Prov. App. No. 63/423,773, and U.S. Prov. App. No. 63/430,644. One or more of these references disclose portable hyperspectral maize leaf scanners adapted to image the full maize leaf area with both high-spatial and high-spectral resolutions. The imaging chamber was specifically designed for maize leaf which can strictly control the imaging environment and block outside noises. With its transmittance imaging technology, these systems were able to capture high-quality and high-resolution texture details of a plant leaf distributed across the spatial dimension of a hyperspectral image. Following a similar design principle for maize, one or more of the disclosed systems disclose for scanning plant leaves, e.g., soybean leaves, corn leaves, and other plant leaves, inheriting the same characteristics mentioned above.

However, while there have been improvements in capturing images of a leaf surface, image analysis methodology has been lagging. Most of the previous HSI image processing algorithms for plant phenotyping only calculated features from the averaged spectrum but not considering how the colors were spatially distributed across the leaf area. The distribution information captured in the image is highly related to the physiological conditions of the plant. Previous studies discovered that plants under biotic and abiotic stresses could have different symptoms distributed across the plant leaves. For example, according to the Arkansas Soybean Handbook plants under nitrogen, phosphorous, or potassium deficiencies resulted in different color patterns on the leaf.

Different nutrient stresses result in different spatial distribution patterns on the leaf which are needed to elevate the quality of plant phenotyping information that represents one of the key features for improving the plant phenotyping quality. For example, many researchers discovered that Soil Plant Analysis Development (SPAD) chlorophyll meter readings varied significantly at different locations on the leaf for plants such as maize. Because the SPAD readings at different locations contribute uniquely to the prediction of chlorophyll contents, measuring multiple spots of the leaf is needed to estimate crop N status. Researchers have devised different indexes to assist in the analysis of plant leaves. For example, an entire leaf averaged Normalized Difference Vegetation Index (NDVI), which is an index that quantifies vegetation by measuring the difference between near-infrared, strongly reflected by vegetation, and red light, absorbed by vegetation, was introduced. However, NDVI is an index system that still operates on averages and normalization. Thus, simply averaging the spatial domain, i.e., the primary prevailing methodology, disregards useful distribution.

Therefore, there is an unmet need for a novel imaging system and methodology that can analyze spatial information in a plant leaf to provide encoding distribution information of the leaf.

SUMMARY

A method for spatial analysis of leaf images is disclosed. The method includes acquiring one or more images from one or more leaves of one or more plants, generating 3-dimensional (3D) images from the acquired one or more images from associated spectral heatmaps. The method also includes identifying a stem and a plurality of veins coupled to the stem in each generated 3D image. Furthermore, the method includes identifying i) one or more of valleys and ridges as regions between two consecutive veins from the plurality of veins, or ii) one or more of peaks and valleys as regions between two consecutive veins from the plurality of veins in the one or more generated 3D images. Additionally, the method includes calculating average slopes in the generated 3D images between i) one or more of peak-to-valley, or ii) ridge-to-valley for each of the plurality of veins in each of the generated 3D images, and calculating a nitrogen index based on the calculated average slopes. If the calculated average slope is between two thresholds, then communicate to a user to add a predetermined chemical to the one or more plants.

A method for spatial analysis of leaf images id also disclosed. The method includes acquiring one or more images from one or more leaves of one or more plants. Furthermore, the method includes identifying a stem and a plurality of veins coupled to the stem and mesophyll regions adjacent each vein of the plurality of veins in each acquired image. Additionally, the method includes calculating a nitrogen stress index based on spectral index values of pixels in the identified mesophyll regions. If the calculated nitrogen stress index is between two thresholds, then communicate to a user to add a predetermined chemical to the one or more plants.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 4a-4h are schematics showing processing steps according to the present disclosure, wherein FIGS. 4a and 4b depict the resultant RGB and Normalized Difference Vegetation Index (NDVI) heatmap images after image acquisition, spectral calibration and aspect ratio calibration shown in FIGS. 3a-3d, FIG. 4c depicts manual or automated vein tracing, FIG. 4d depicts process of determining leaf mask, FIG. 4e depicts the process of skeletonization from FIG. 4c, FIG. 4f depicts the process of generating mesophyll mask from FIGS. 4c and 4d, FIG. 4g depicts the NLCS transformation using the new coordinate system, and FIG. 4h depicts pixel allocation based on the new coordinate system from FIGS. 4g and 4h.

FIG. 6e is a schematic of a cutout shown in FIG. 6a.

FIG. 6f is a schematic of a cutout shown in FIG. 6c.

DETAILED DESCRIPTION

Figure 1:
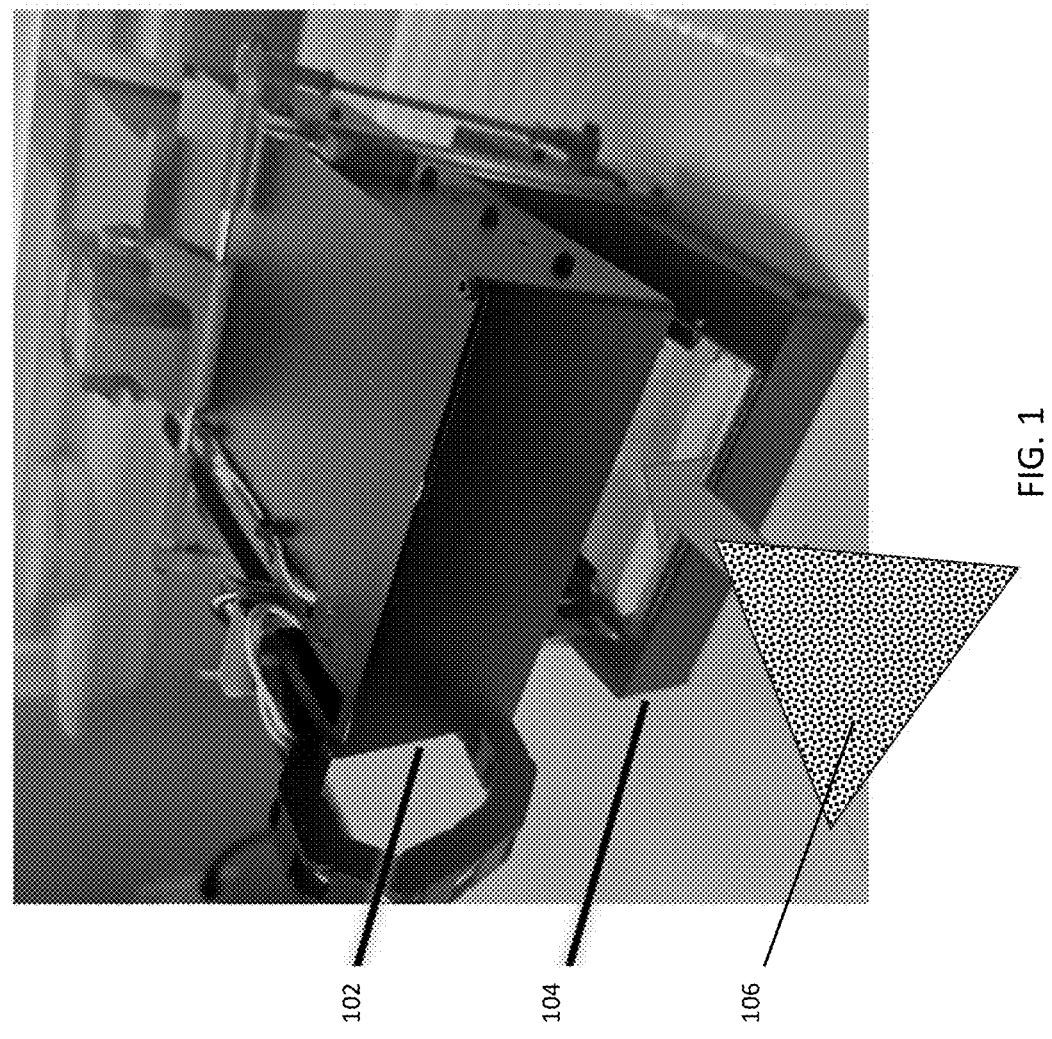
FIG. 1 is schematic of a system of the present disclosure adapted to obtain images from a variety of different plant leaves, including soybean, corn, and other plants.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel imaging system and methodology is disclosed herein that can analyze spatial information in a plant leaf, e.g., a soybean plant leaf, a corn plant leaf, or other plant leaves, to provide encoding distribution information of the leaf. Towards this end, the present disclosure introduces a new method for remapping and encoding each leaf pixel to an innovative coordinate system, generalized herein as the Natural Leaf Coordinate System (NLCS). NLCS describes the relative position of every pixel to the main venation system of the leaf and this relationship allows image processing researchers to explore the distribution patterns more naturally. Second, a new nitrogen index (NLCS-N) is described based on the NLCS to demonstrate improved accuracy and robustness in predicting the nitrogen content of plants, e.g., soybean plants, corn plants, and other plants, and distinguishing between the plants of each variety of plants with different nitrogen deficiency levels. The disclosed NLCS-N outperforms the known whole leaf averaged Normalized Difference Vegetation Index (NDVI) in terms of predicting the nitrogen content of the plant, e.g., soybean plant, corn plant, and other plants, and distinguishing the nitrogen-sufficient plants from the nitrogen-deficient ones more effectively. NDVI provides a measurement of the difference between visible and near-infrared (NIR) light reflectance from vegetations, e.g., a leaf, to thereby generate a view of photosynthetic activity.

To carry out a study of how the spatial distribution information on a single leaf can help to predict the nitrogen condition of the plant, e.g., soybean plant, corn plant, and other plants, an experiment was conducted in a greenhouse. All plants were seeded in mid-February and were grown until the data collection day at the end of March. The air temperature in the greenhouse was stabilized to between 24° C. and 29° C. The experiment had a full factorial design with three fixed factors including plant genotypes, irrigations, and nitrogen treatments. There were two levels for each of the three fixed factors respectively, including two plant genotypes: PIONEER-P34T21SE (PN) and THORNE (TH); two irrigation treatments: well-watered (WW) and drought-stressed (DS); and two nitrogen fertilizer treatments: high-nitrogen (HN) and low-nitrogen (LN). Eight replicates of plants were included under each treatment.

Specifically, the experiment unit was one soybean plant in a plastic pot; however, it should be understood that other plants including corn could have been used instead. Thus, a total of 64 (2×2×2×8) soybeans were seeded in plastic pots filled with a mix of 67% Sun Gro Metro-Mix 510 Grower Mix potting media and 33% Greens Grade™ profile in terms of volume. Each pot was about 18 centimeters in diameter and about 20 centimeters in depth. For the irrigation treatments, all pots were irrigated with about 500 mL water daily from the day of seeding until germinated, then every 2 days after germination to keep the potting media's volumetric moisture level above 30%. Irrigation was stopped for the DS group 4 days before the sampling day. Two types of fertilizer solutions were prepared with ANDERSONS® Fertilizer. The solution for the HN group was made of 8.333 g 6-24-24 and 7.609 g 46-0-0 dissolved into 1 L of water, while the solution for the LN group was made with only 8.333 g 6-24-24 dissolved into 1 L of water. Every plant was fertilized with about 50 mL of the corresponding solution every week. To avoid the micro-climate effect in the greenhouse, all plants were shuffled randomly every week.

About 50 days after seeding the plants were at the V6 stage, 3 leaves of the top fully expanded trifoliate were scanned with a hyperspectral imaging system (HSI), resulting in 192 hyperspectral cube data files in total. A photograph of the imaging system (IS) 100 for imaging plant leaves, e.g., soybean leaves, corn leaves, and other plant leaves, is provided in FIG. 1. A disclosure of IS 100 is provided in U.S. patent application Ser. No. 18/387,991 and U.S. Pat. No. 11,536,663 to Jin et al., each of which incorporated herein by reference in its entirety into the present disclosure. The IS 100 includes a housing 102 which houses an articulation motor (not shown), a drive mechanism (not shown), and a camera (not shown), as well as a lightbox 104 for illuminating a leaf 106 once positioned between the lightbox 104 and the housing 102. The articulation motor (not shown) along with the drive mechanism (not shown) articulate the housing 102 and the lightbox 104 into an open position such that the leaf 106 can be placed inside an opening, thus constituting an open position as shown in FIG. 1; as well articulate the housing 102 and the lightbox 104 into a closed position such that the leaf 106 is positioned therebetween thus blocking ambient light. Inside the IS 100, a hyperspectral camera (not shown) is moved by a camera motor (not shown) for scanning the plant leaf 106 with a push-broom mechanism (not shown), providing high spatial and spectral resolutions and a high signal-over-noise ratio. Specifically, with the push-broom mechanism (not shown), the camera in the IS 100 is configured to scan the leaf 106 with a high resolution rate, e.g., 266 lines, 244-pixel wide, and 368 wavebands, resulting in a 244×266×368 hyperspectral cube. In this exemplary embodiment, the 244×266 spatial resolution covers an area of about 85 mm by about 120 mm. Immediately after being scanned by IS 100, the portion above the soil of each plant was cut, prepared, and sent to a laboratory (A&L Great Lakes Laboratories, Inc.) for analyzing the nitrogen content in order to provide reference data.

Figure 2:
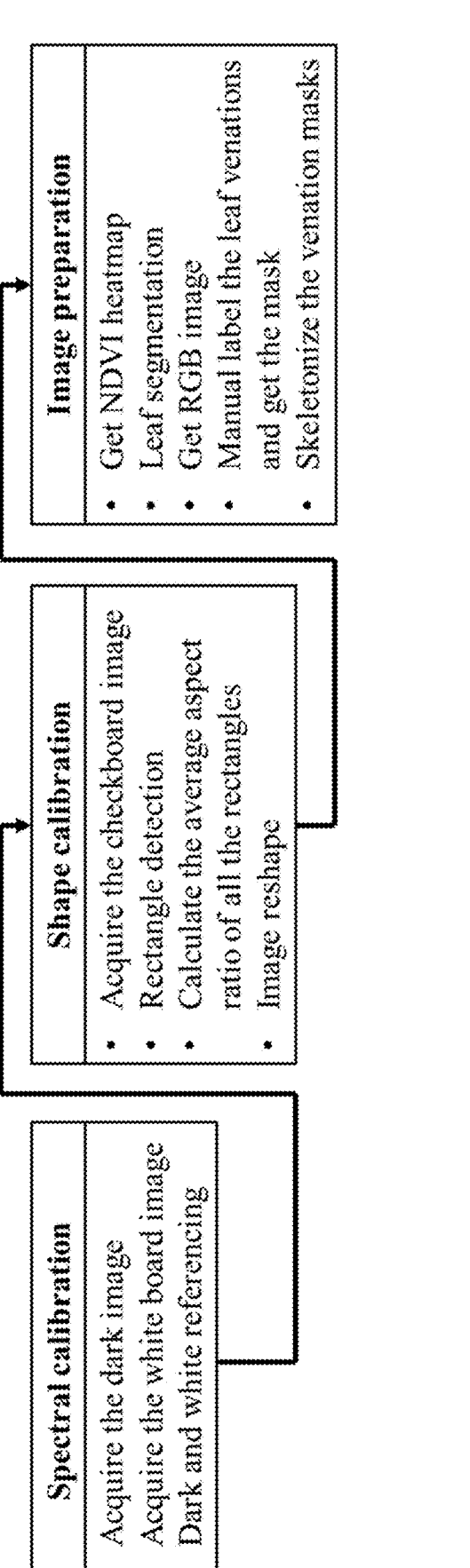
FIG. 2 is a block diagram which shows a workflow of the data preprocessing needed prior to the establishment of Natural Leaf Coordinate System (NLCS).

Referring to FIG. 2, a block diagram is shown which shows a workflow of the preprocessing steps needed prior to the establishment of NLCS. It was important to carry out these preprocessing steps first because the shape of the leaf could affect the building of NLCS and eventually affect other related analyses. Specifically, FIG. 2 provides procedures of data preprocessing including spectral calibration, shape calibration, and image preparation for each HSI image acquired from a leaf imaging system, e.g., the IS 100. FIG. 2 is subdivided into three major blocks: 1) spectral calibration; 2) shape calibration; and 3) image preparation. Each of these blocks is described herein below.

Figures 3A, 3B, 3C, 3D:
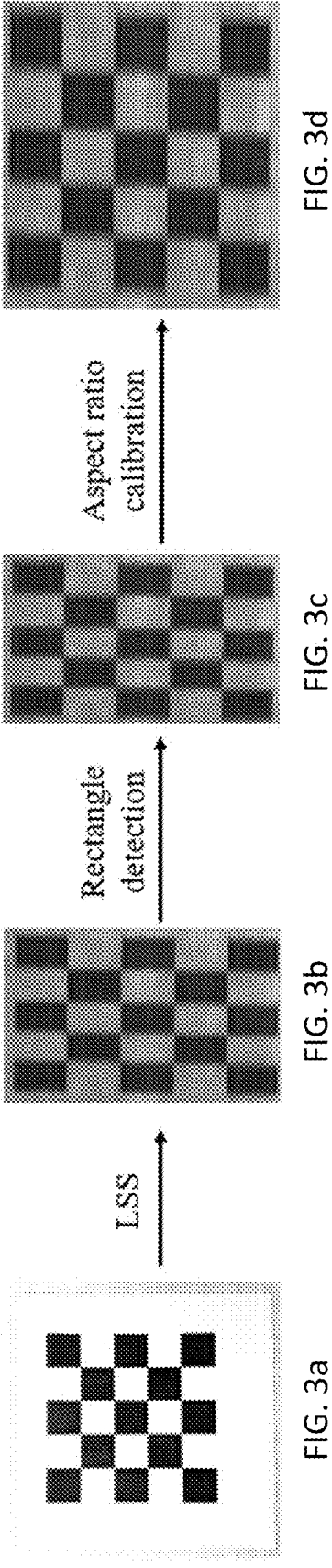
FIGS. 3a-3d are a plurality of images that describe the aspect ratio calibration process, according to the present disclosure.

The spectral and shape calibration are two blocks directed to calibration of the hyperspectral images. Due to the scanning mechanism and potential lighting quality changes, the raw hyperspectral image needs both spectral for leaves of all plant types, e.g., a soybean leaf, a corn leaf, etc., and shape calibration for various plant types, e.g., a soybean leaf. For spectral calibration, a white reference image is first acquired by directly taking a line scan of a white PVC board installed in the imaging device, e.g., the IS 100, with the light on, and a dark reference image is next acquired with the light off. The dark image was subtracted from the raw image to remove noise attributable to dark noise. The result was then divided by the sum of the white image and the dark image. Due to a slight image stretching in the vertical direction resulting from the optical design of various imaging devices, e.g., the IS 100, a shape calibration is ensued to restore the leaf image close to its original shape. Referring to FIGS. 3a-3d, a plurality of images are shown that describe the shape calibration process. The shape of a raw image from an image system, e.g., IS, was calibrated using the detected rectangle aspect ratio from a scanned chessboard image. FIG. 3a is a photograph of the chessboard image printed on paper. FIG. 3b is a photograph of a grayscale chessboard image obtained by the imaging device, e.g., the IS 100. FIG. 3c is a photograph of a rectangle edge detection algorithm. Specifically, the imaging device, e.g., the IS 100, scans a chessboard image printed on paper, in which every black square is about 8.0 mm wide. FIG. 3a shows an example of such a chessboard image. All the bounding boxes were detected in the grayscale chessboard image using, e.g., the "regionprops" function in MATLAB™. An example of the grayscale image is provided in FIG. 3b. The mean of all bounding boxes' aspect ratios was then used to reshape the original image with linear interpolation. For each new acquired image, the acquired image is resized using the averaged aspect ratio with the "imresize" function in MATLAB. As an example, the calibration was able to correct all black rectangles in the chessboard image back to squares. However, it should be noted that other techniques can be used, known to a person having ordinary skill in the art, to correct the aspect ratio back to the squares, shown in FIG. 3d.

After all the calibrations above, the Normalized Difference Vegetation Index (NDVI) was used for segmenting the leaf region from the background because this index was discovered to have a high correlation with green vegetation. A combination of red and near-infrared, e.g., 670 nm and 800 nm were selected as the red and near-infrared wavelengths, respectively, for calculating the NDVI value for every leaf pixel using Equation (1) shown below.

$$NDVI = \frac{I_{NIR} - I_{RED}}{I_{NIR} + I_{RED}} \tag{1}$$

where $I_{NIR}$ and $I_{RED}$ are the pixel intensities at the wavelengths of near-infrared and red, respectively. A fixed threshold NDVI value of about 0.4 ensured a clean separation between the leaf pixels and the background pixels.

Figures 4A, 4B, 4C, 4D, 4E, 4F, 4G, 4H:
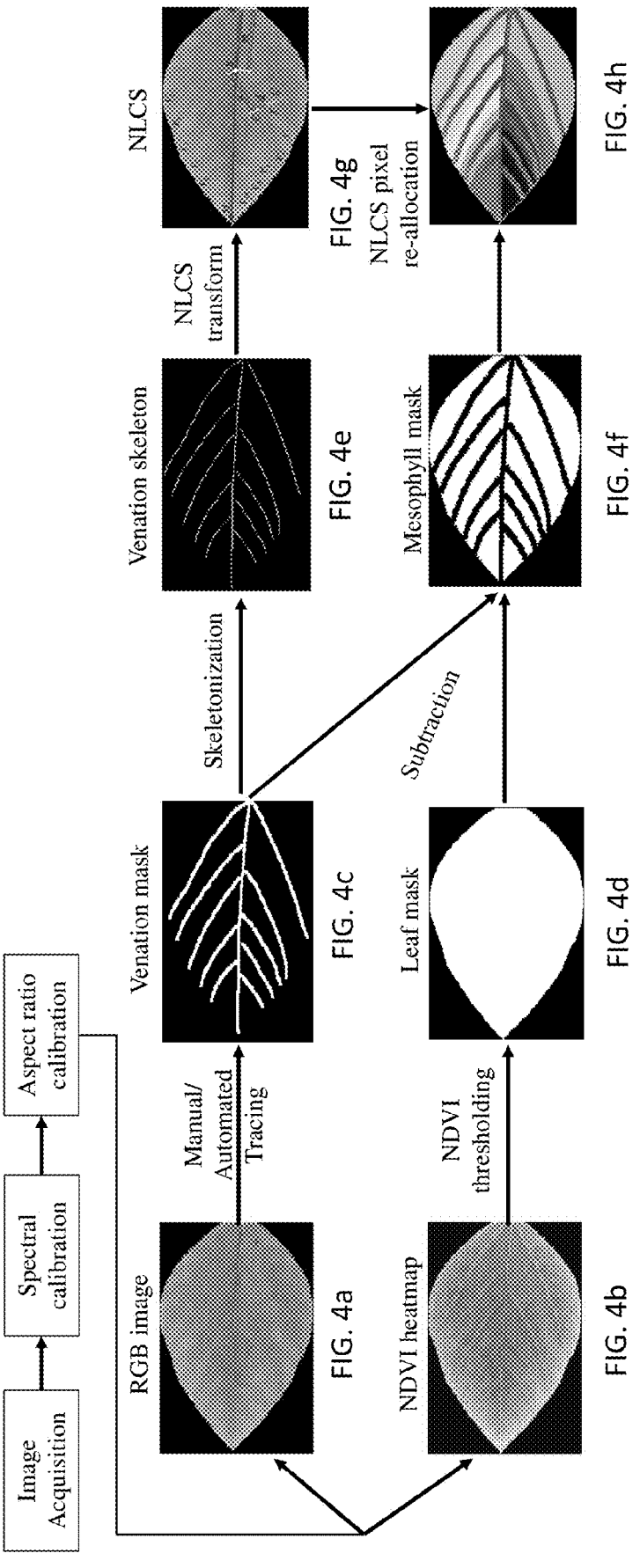

Image preparation is now described. To make it easier to manually label the venations of each leaf, a red-green-blue (RGB) image was generated from every HSI cube file. The wavelengths selected for the R, G, and B channels were 630 nm, 530 nm, and 465 nm, respectively, with which the generated images demonstrated high contrasts between the leaf venations and the other areas. Referring to FIGS. 4a, 4b, 4c, and 4d, for every RGB image, the midrib and the veins are manually or automatically traced and saved in separate mask images using PHOTOSHOP™ software. This operation is performed after an RGB image is acquired, the RGB image is spectrally calibrated, followed by a calibration process of the aspect ratio, as discussed above. For the automated tracing process, various techniques can be implemented. For example, a deep convolutional neural network model, e.g., U-Net or MaskRCNN, known to a person having ordinary skill in the art, can be trained to output the venation mask from the calibrated images of a plant leaf, e.g., a soybean leaf, corn leaf, and other plant leaves, as shown in FIG. 4a. Alternatively, a segmentation algorithm developed based on a Local Binary Patterns filter, known to a person having ordinary skill in the art, can be applied to identify corn venations from an NDVI heatmap acquired from an image acquisition system, e.g., the IS 100 (see FIG. 1). FIG. 4*c*, shows the obtained venation mask image of the midrib and the primary veins. FIG. 4*e* provides skeletonizing masks of FIG. 4*c*. FIG. 4*g* shows NLCS transformation using the new coordinate system by identifying each pixel based on the (m, v, d) coordinates. FIG. 4*b* is an NDVI heatmap obtained from a multispectral image of the leaf. FIG. 4*d* is a black and white image based on NDVI thresholding to generate the outline of the leaf. Subtraction of FIG. 4*c* from FIG. 4*d* results in the mesophyll mask shown in FIG. 4*f*. Using the mesophyll mask of FIG. 4*f* and the NLCS pixel transformation of FIG. 4*g*, an NLCS pixel allocation chart is presented in FIG. 4*h*.

Figure 5B:
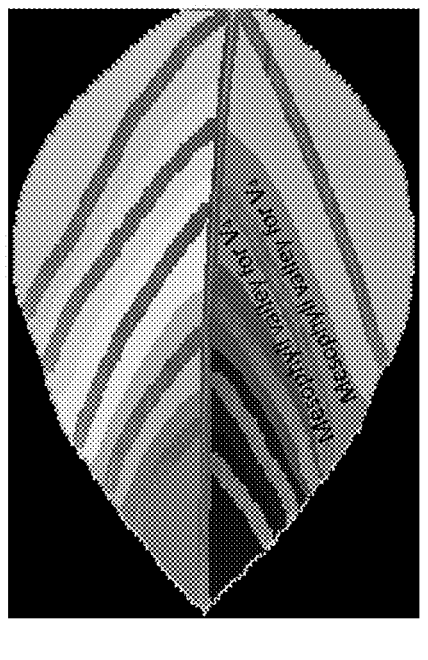
FIGS. 5a-5b are diagrams depicting how the NLCS is established, according to the present disclosure, as previously shown in FIGS. 4g-4h.
Figure 5A:
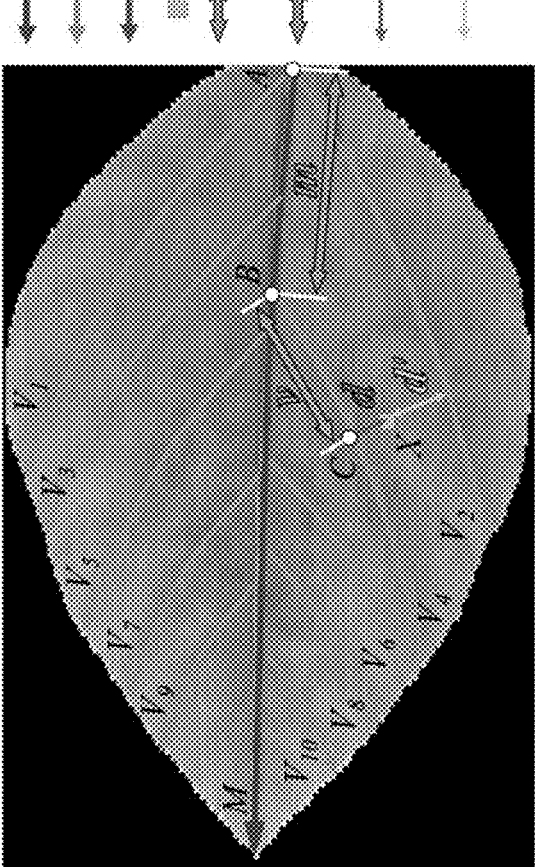

The novel NLCS coordinate system of the present disclosure comes with three coordinate values (m, v, d). To determine the three unique coordinate values, there are 2 types of referencing lines called Axis M and Axis V. Axis M is defined as the skeletonized midrib pixels initiating from the leaf petiole, while Axis V is defined as the skeletonized vein pixels initiated from axis M, while d is shortest Euclidean distance from a given axis V. The total number of Axis V reference lines depends on the number of veins that are visible to be labeled. Referring to FIGS. 5*a* and 5*b*, which are enlarged views of FIGS. 4*g* and 4*h*, diagrams of how the NLCS is established are provided. Specifically, FIG. 5*a* shows definitions of the three main axes of NLCS, while FIG. 5*b* shows the pixels' allocation results based on every pixel's Euclidean distance to leaf veins. In particular, each pixel was allocated to a specific vein by determining which vein skeleton had the smallest Euclidean distance (d) to the pixel. For example, taking the yellow marked pixel X in FIG. 5*a*, the allocation results in FIG. 5*b* which shows that the pixel X was allocated to Axis $V_4$ (darker blue) instead of Axis $V_2$ (lighter blue). The reason was that the shortest Euclidean distance from the pixel X to Axis $V_4$ is shorter than the Euclidean distance from the pixel X to Axis $V_2$ (i.e., d<d'). Applying the same rule to all the mesophyll pixels, the allocation results are shown in FIG. 5*b* in which each color marked all the pixels allocated to one vein. The connection pixel B shown in FIG. 5*a* had a geodesic distance of m pixels measured along Axis M from the leaf petiole starting location labeled as pixel A. Pixel C was the pixel on vein No. 4 ($V_4$) that had the closest Euclidean distance to pixel X. The geodesic distance from C to B along Axis $V_4$ was v, and the Euclidean distance from X to C was d. So, the new coordinates of the yellow pixel X are (m, v, d). While the value of m is always positive, the signs of v and d were defined based on the relative position. By standing on the reference axis M and facing toward the direction of arrow of axis M, if Axis V is on the lefthand side of Axis M, the v value is negative, otherwise positive. If a pixel is on the lefthand side of the Axis V, the d value is negative, otherwise positive. Therefore, in the example shown in FIG. 5*a*, m is positive (that is, m is always positive), v is negative as the cross-point C is on the lefthand side of axis M and d is negative since the pixel X is on the lefthand side of the axis $V_4$.

Figures 5C, 5D:
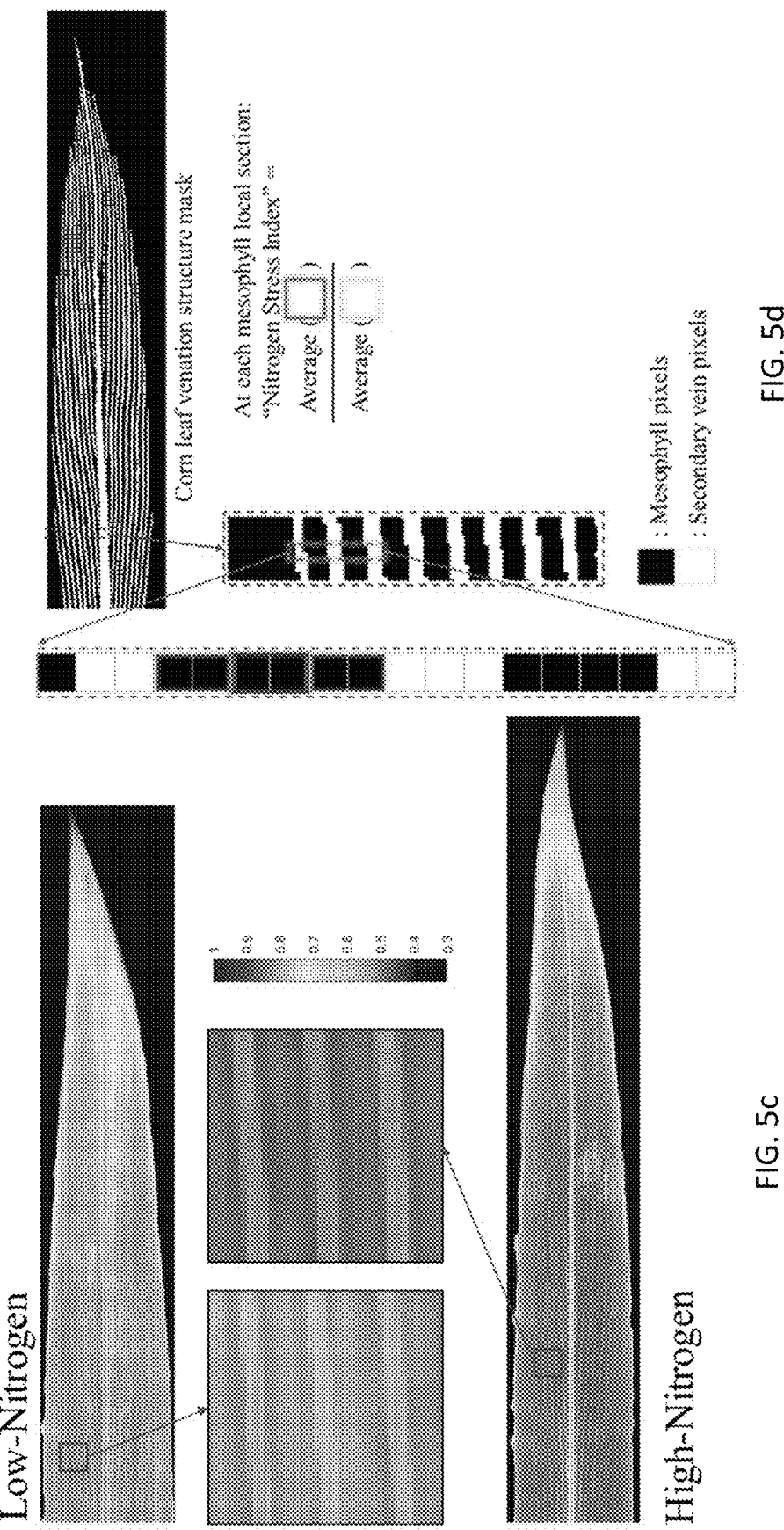
FIG. 5c is a heatmap obtained from a hyperspectral imaging system, e.g., the system of FIG. 1, of a corn leaf.
FIG. 5d is a schematic that demonstrates calculation of Nitrogen stress index which is one example calculation based on the ratio of average of high nitrogen to average of low nitrogen in the mesophyll locations.

According to one embodiment, after obtaining a heatmap using spectral wavelengths that are related to the chlorophyll content, the nonuniformity of the pixel values between two adjacent secondary veins can be used to predict the plant nitrogen content or the nitrogen stress levels. The segmentation masks for the primary vein (see FIG. 4*c*) plus secondary veins, and mesophyll area (see FIG. 4*e*) constitute a so-called "corn leaf venation structure mask." The nonuniformity can be quantified in many ways, including but not limited to the ratio, difference, or normalized difference between the mesophyll pixels next to the veins and the mesophyll pixels at the center. FIG. 5*c* demonstrates calculation of Nitrogen stress index which is one example calculation based on but not limited to the ratio, difference, or normalized difference between the NDVI values of mesophyll pixels (see, e.g., FIG. 5*d*).

With the obtained corn leaf venation structure mask, the primary vein value distributions, such as the average value, variation, and the value changing speed from left to right, are also correlated to the nitrogen stress condition and nitrogen content values.

It should be noted that the calculations described above can be applied to any 2-dimensional heatmap images derived from a hyperspectral image system, e.g., the IS 100 (see FIG. 1), thus generating a large number of spatial-spectral features for building a comprehensive model that can predict the plant's, e.g., the corn plant's, nitrogen content with improved accuracy and robustness, as shown and discussed below.

Figure 6A:
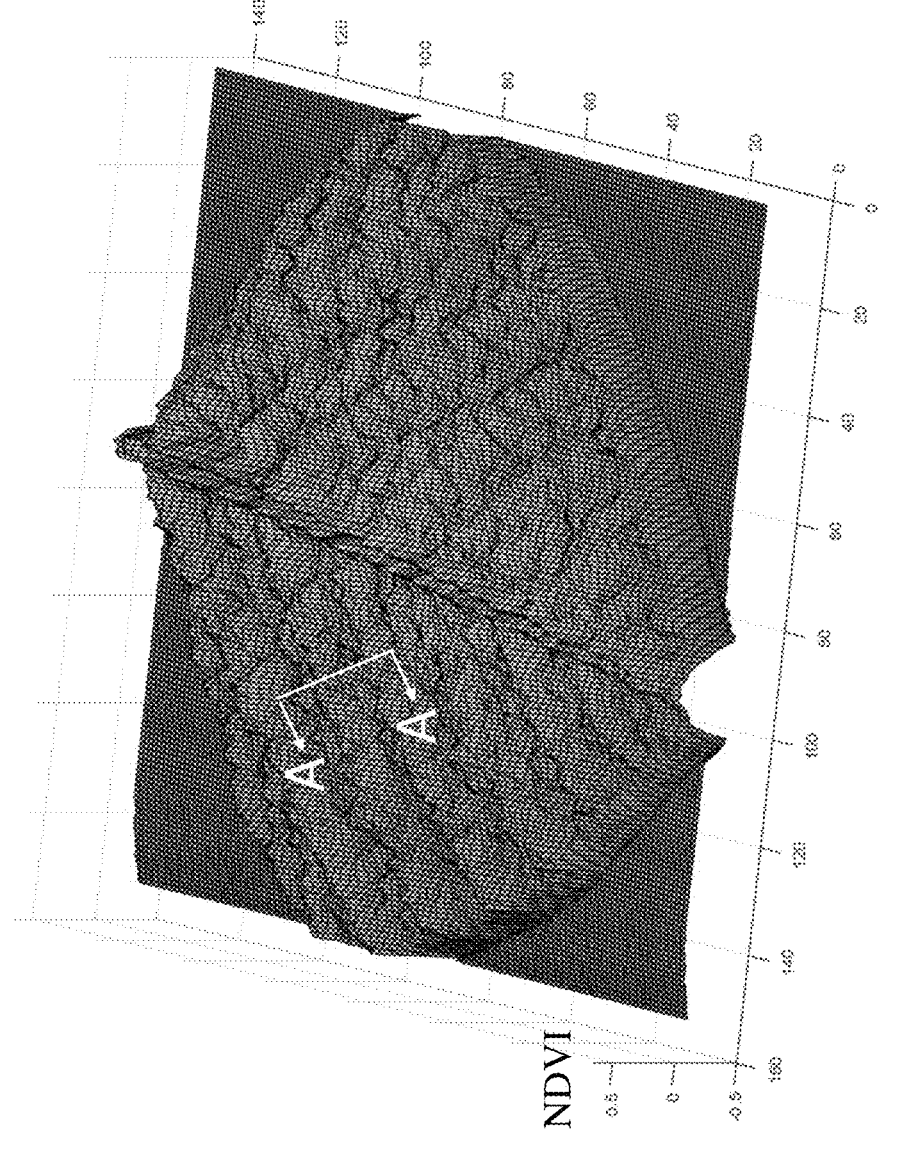
FIGS. 6a and 6c are diagrams which show how NDVI values are mapped to the depth dimension and plotted in 3D graphs, according to the present disclosure.
Figure 6B:
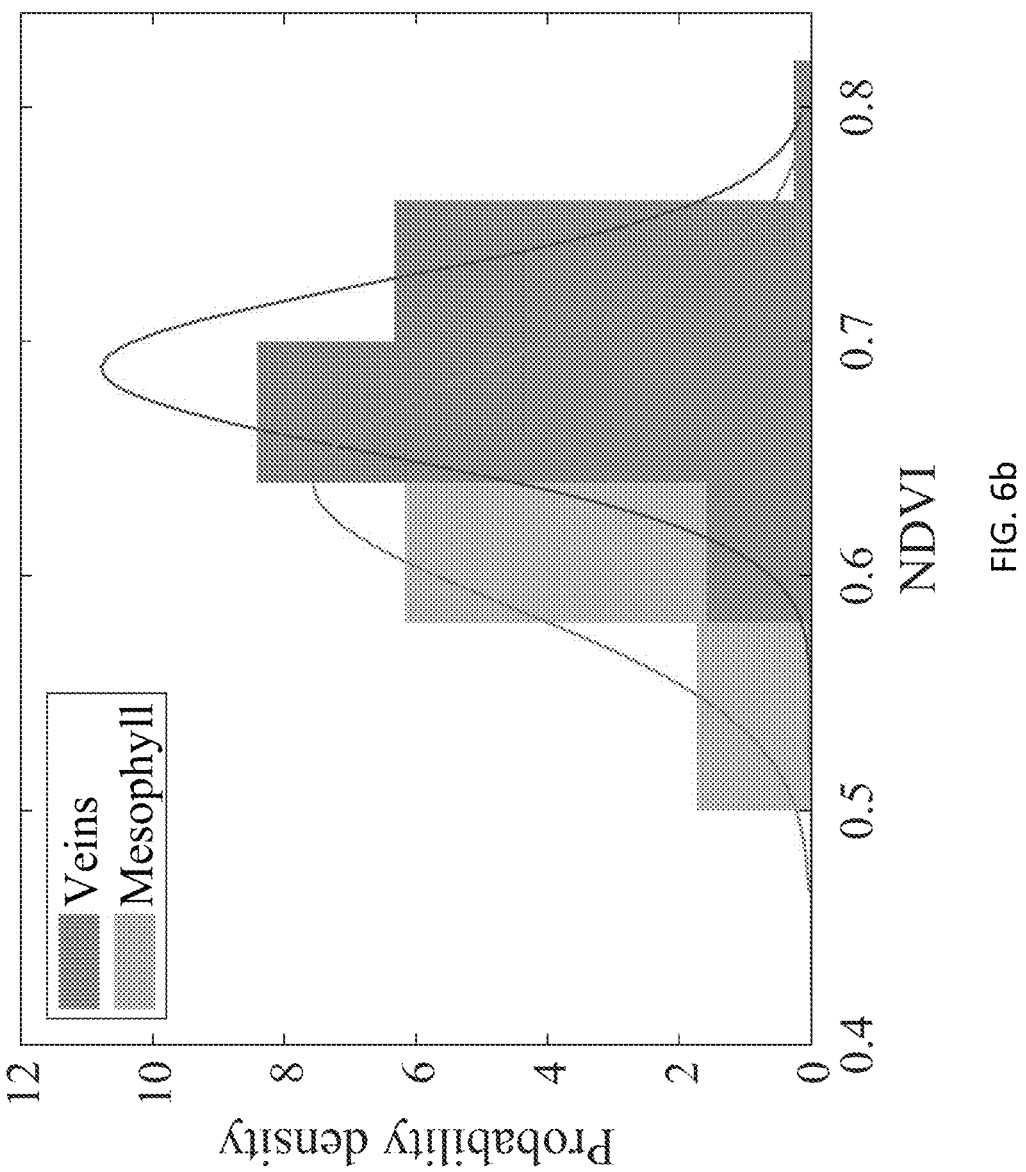
FIGS. 6b and 6d are histograms and the estimated probability densities of the NDVI values in veins and mesophyll regions, corresponding to FIGS. 6a and 6c, respectively, according to the present disclosure.
Figure 6C:
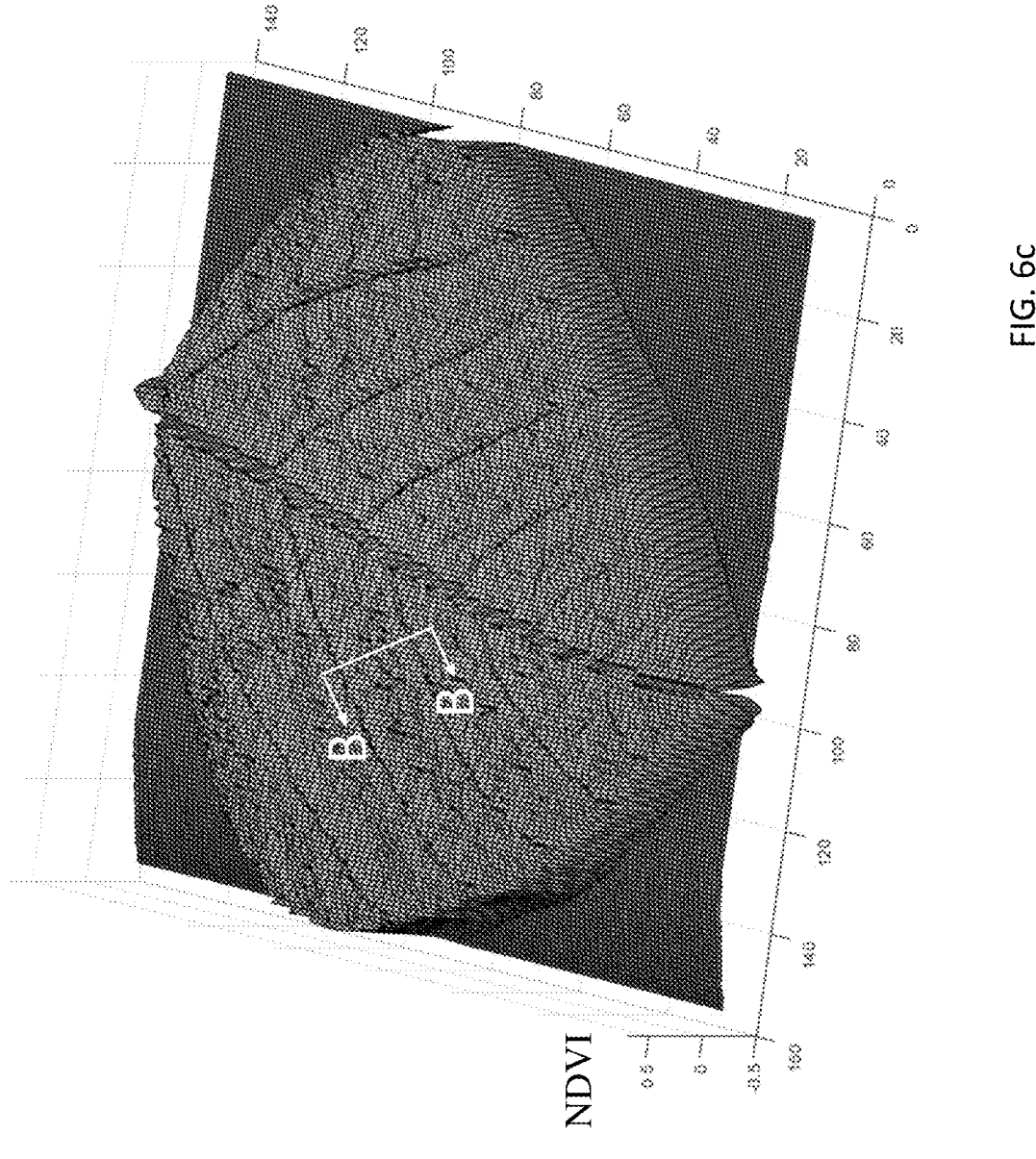
Figure 6D:
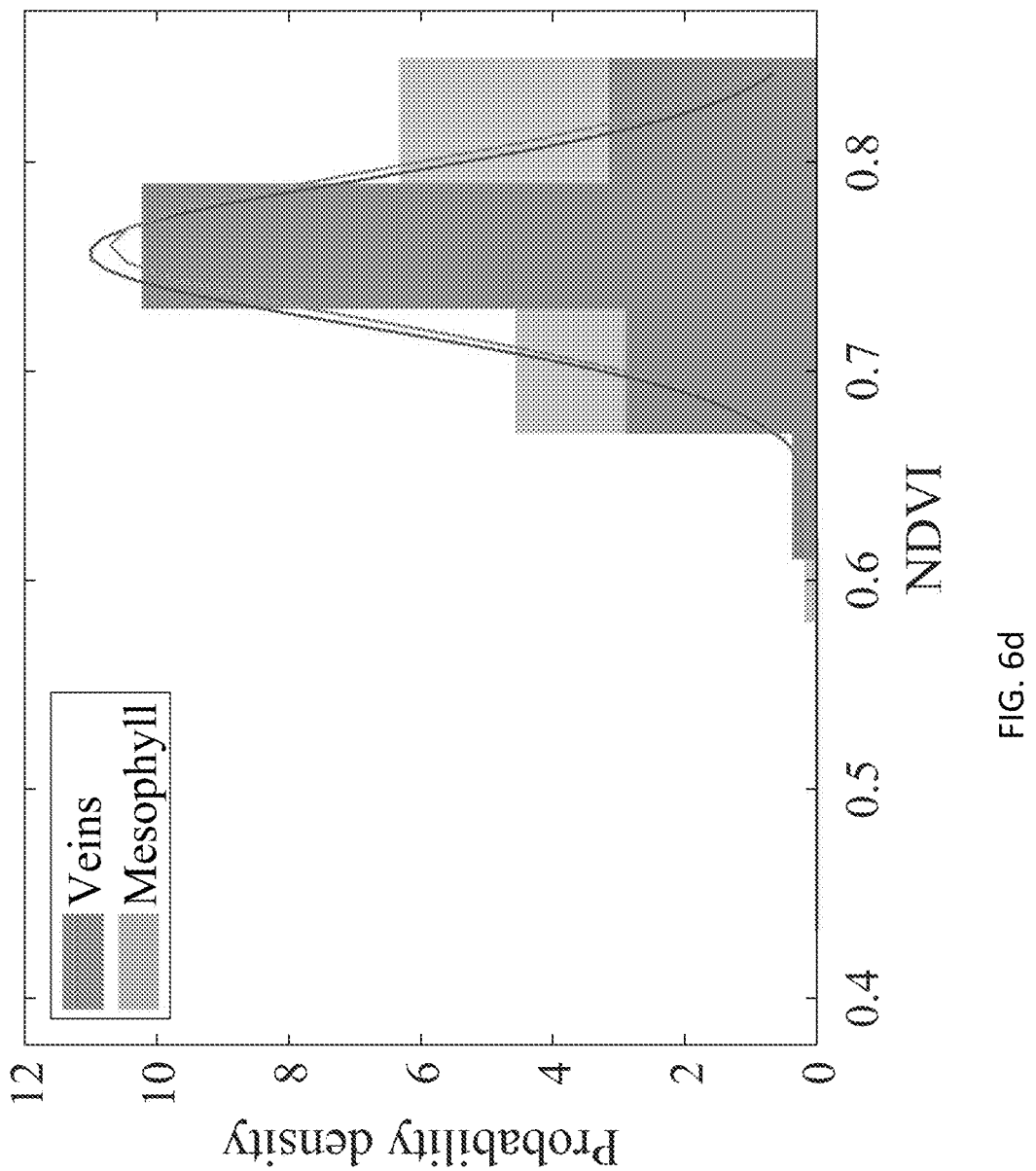
Figures 6E, 6F:
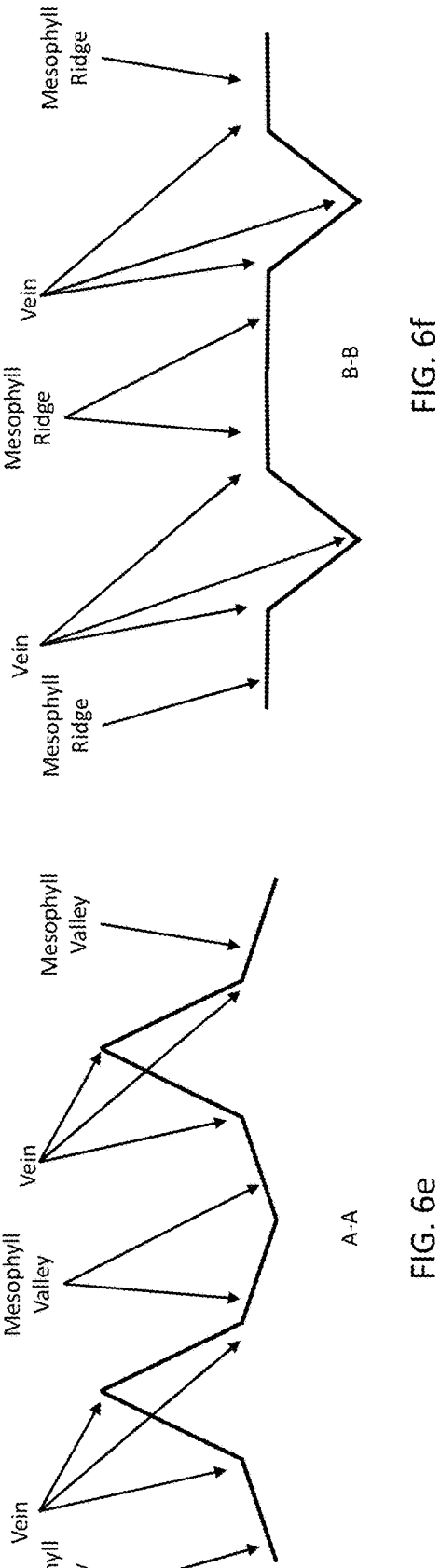

For easier observation, NDVI values were mapped to the depth dimension and plotted in 3D graphs, which are shown in FIGS. 6*a* and 6*c* for a low nitrogen condition and a high nitrogen condition, respectively, which depict three-dimensional depth plots based on the new coordinate system. By comparing different NDVI distribution patterns of a low-nitrogen and a high-nitrogen plant leaves, e.g., soybean leaves, corn leaves, and other plant leaves, the contrast in NDVI values between the veins and mesophyll areas changed dramatically under different nitrogen supplies. For example, as shown in FIG. 6*a*, in the low-nitrogen condition the veins represent peaks and mesophyll regions represent valleys; whereas, in FIG. 6*c* the mesophyll regions are similar to ridges, while the veins represent valleys. Histograms and the estimated probability densities of the NDVI values in veins and mesophyll regions are shown in FIGS. 6*b* and 6*d*, corresponding to FIGS. 6*a* and 6*c*, respectively. Sections A-A and B-B in FIGS. 6*a* and 6*c* are redrawn in schematics shown in FIGS. 6*e* and 6*f*, respectively. NDVI values in the mesophyll regions are distributed in a relatively smaller value range than in the mesophyll regions. Thus, the new nitrogen index NLCS-N was built based on the local NDVI ratio between the mesophyll pixels and vein pixels as described below with respect to FIG. 6*g* which is a schematic of a leaf with one vein ($V_4$) shown in the shape of a peak and valleys representing a low-nitrogen condition depicted in FIGS. 6*a* and 6*e*.

Figure 6G:
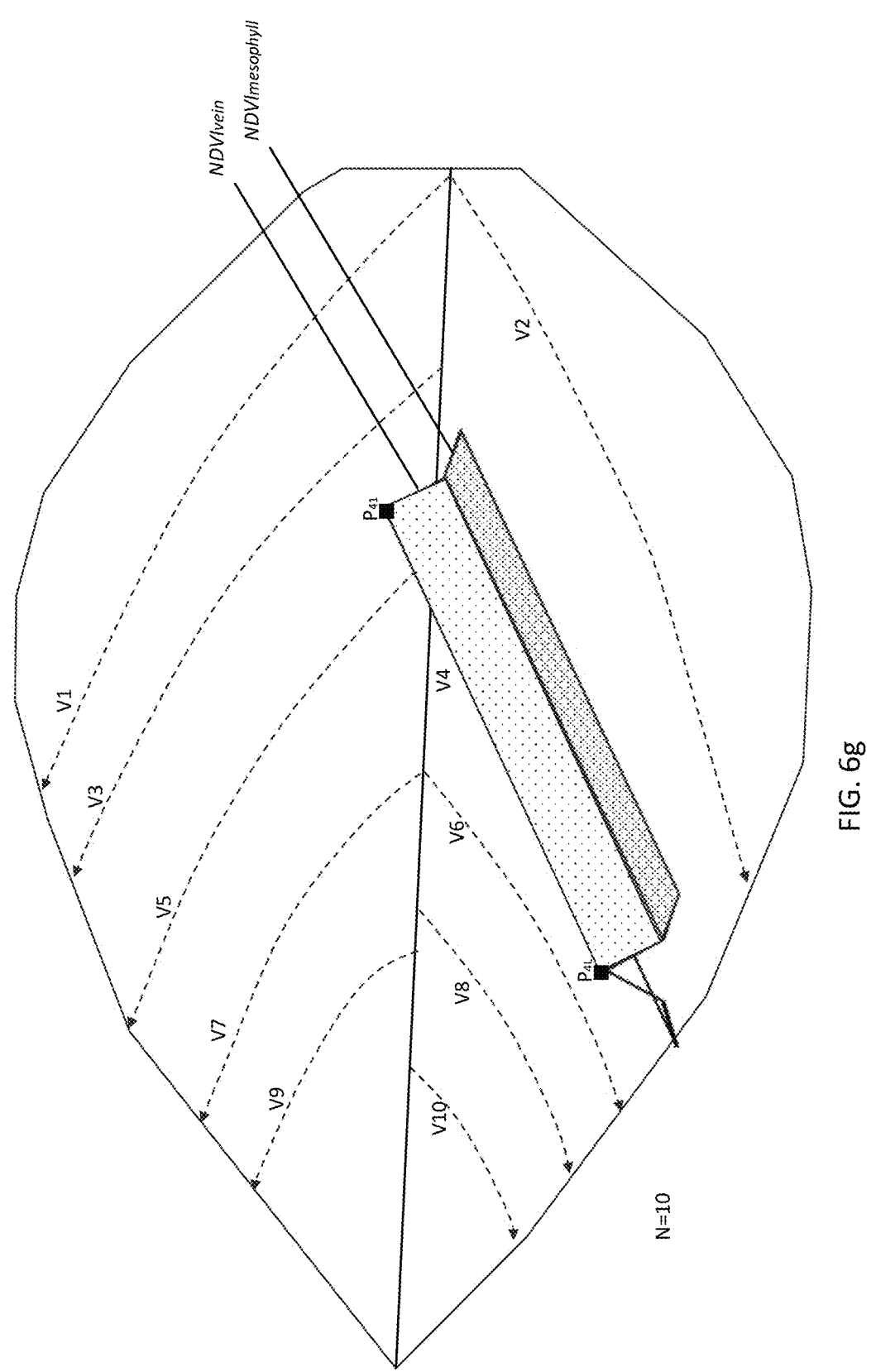
FIG. 6g is a schematic depicting how slope averages are determined.

This new nitrogen index NLCS-N was developed based on NLCS that can extract the NDVI contrast features between veins and mesophyll areas, calculated using exemplary relations, e.g., Equation (2) shown below. One NLCS-N index value could be calculated for each leaf image.

$$NLCS - N = \frac{1}{N}\sum_{i=1}^{N}\left[\frac{1}{L}\sum_{v=1}^{L}\left(\frac{NDVI_{mesophyll\_v}}{NDVI_{vein\_v}}\right)\right] \qquad (2)$$

where N is the total number of labeled secondary veins (see FIG. 6*g* in which N=10), i is the number labeled in the sequence according to the vein's Axis M coordinate (see FIG. 6*g* in which i=1, 2, ... 10). At the $i^{th}$ vein, L is its length in pixels (see FIG. 6*g* in which for i=4, the pixels begin at 1 and end at L). $NDVI_{vein\_v}$ is the mean NDVI value of the vein pixels having the Axis V coordinate equal to the same absolute value of v (see FIG. 6g in which $NDVI_{vein\_v}$ is calculated as the average NDVI values of the vein peak using the NDVI values on both sides of the peak). $NDVI_{mesophyll\_v}$ is the mean NDVI value of all the mesophyll pixels having the Axis V coordinate equal to the same absolute value of v (see FIG. 6 in which $NDVI_{mesophyll\_v}$ is the average NDVI values of the mesophyll valley on both sides of the peak belonging to vein 2, see FIG. 5b and the designation Mesophyll valley for $V_4$). A pseudocode of the calculation is provided below in Table 1.

TABLE 1

A pseudocode showing how the NLCS-N could be calculated with an NDVI heatmap, the labeled leaf venation mask, and every pixel's NLCS coordinates.

```
function NLCS-N:
for each vein (i) in all veins [1,2, ... N]
    for each pixel distance to the midrib (v) in the total vein length [1,2, ... , L]
        find which mesophyll pixels' Axis V coordinate equal to v
        calculate the average of all these pixels = NDVI_mesophyll
        find which vein pixels' Axis V coordinate equal to v
        calculate the average of all these pixels = NDVI_vein
```

$$\text{sum } S = S + \frac{NDVI_{mesophyll}}{NDVI_{vein}}$$

$$\text{sum } S' = S' + \frac{S}{L}$$

$$\text{return } NLCS\text{-}N = \frac{S'}{N}$$

30

Linear correlations between the NLCS-N and the nitrogen content reference data were calculated and compared with the averaged NDVI values of all leaf pixels in one image (Avg. NDVI). In addition, two-sample T-tests were also conducted to check if the NLCS-N was able to separate the plants between two nitrogen treatment groups better than Avg. NDVI. For either the NLCS-N or the Avg. NDVI, the null hypothesis was that the index had the same mean value in high-nitrogen and low-nitrogen groups. All the data processing mentioned in this paper was performed with code scripts composed using MATLAB™ and Python 3.7.

The new coordinate system NLCS was established uniquely for each leaf based on its vascular tissue structures, which are closely related to plant responses to abiotic and biotic stresses like nutrient deficiencies. Most nutrient transportations highly rely on the vascular tissues, resulting in the symptoms of many nutrient deficiencies presented on the leaf with different color patterns relative to the leaf venation structures such as the midrib, veins, or petiole. The new coordinate system NLCS was built individually upon the unique structure of every plant leaf, e.g., soybean leaf, corn leaf and other plant leaves, resulting in HSI with both high spectral and spatial resolutions.

Figure 7:
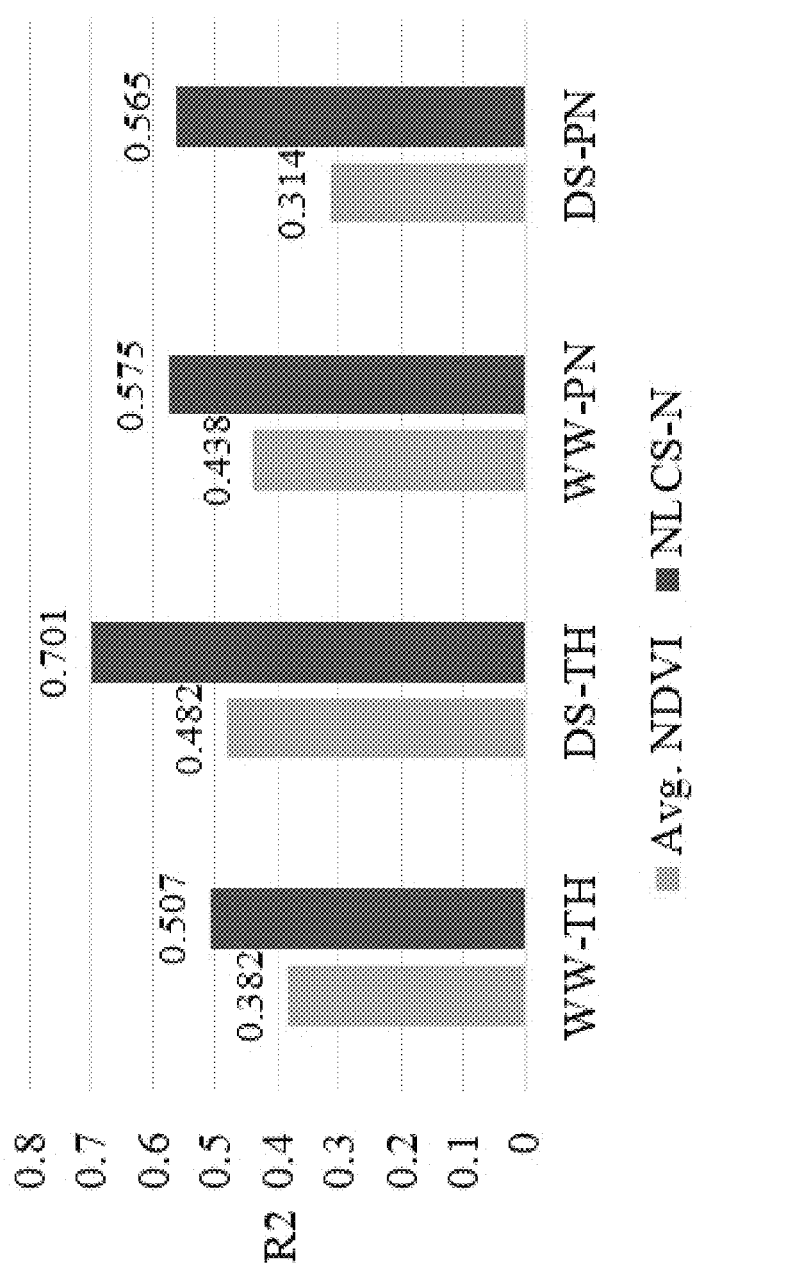
FIG. 7 is a bar chart showing coefficient of determination ($R^2$) values between the whole-leaf averaged NDVI (Avg. NDVI) vs. nitrogen contents and the new nitrogen index (NLCS-N) vs. the nitrogen contents, according to the present disclosure.
Figures 8A, 8B:
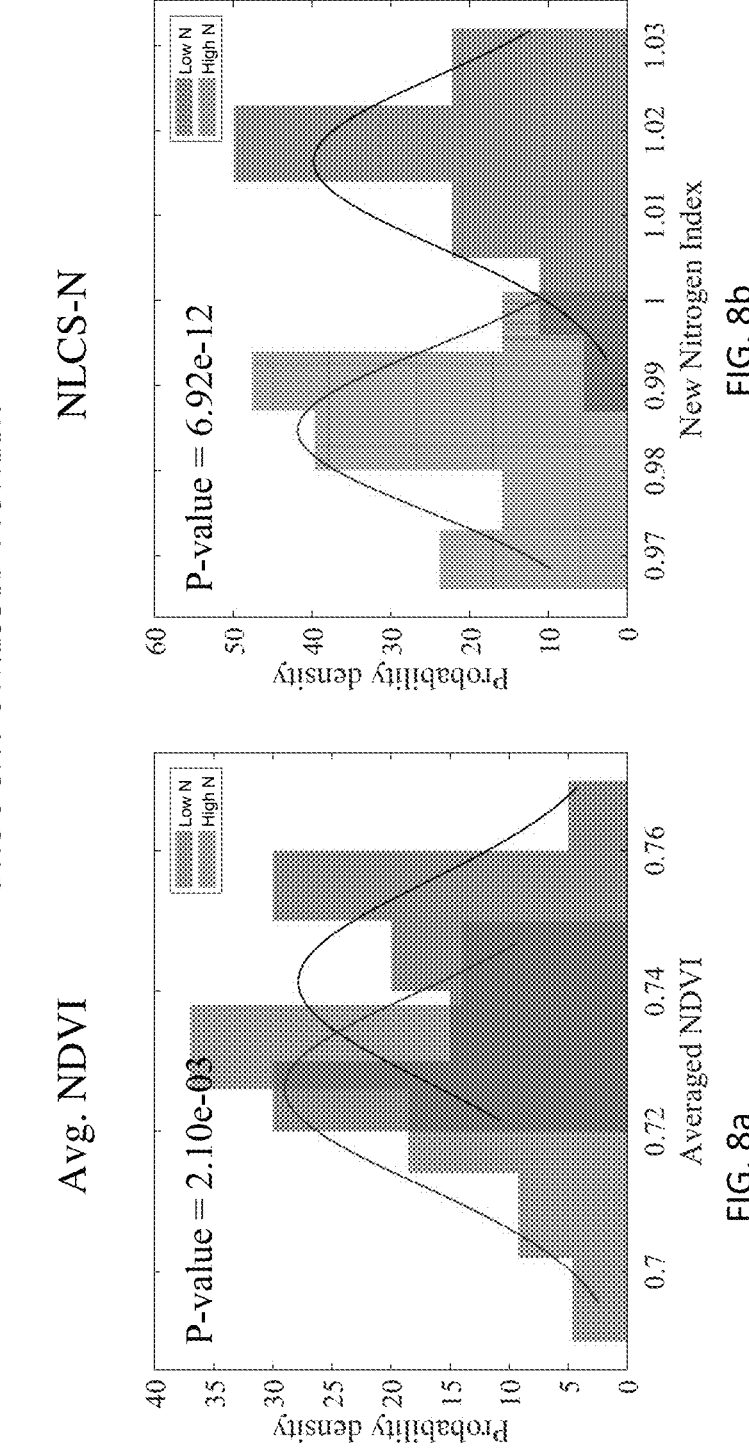
FIGS. 8a-8f are estimated probability density distributions of the Avg. NDVI and the NLCS-N, according to the present disclosure.
Figures 8C, 8D:
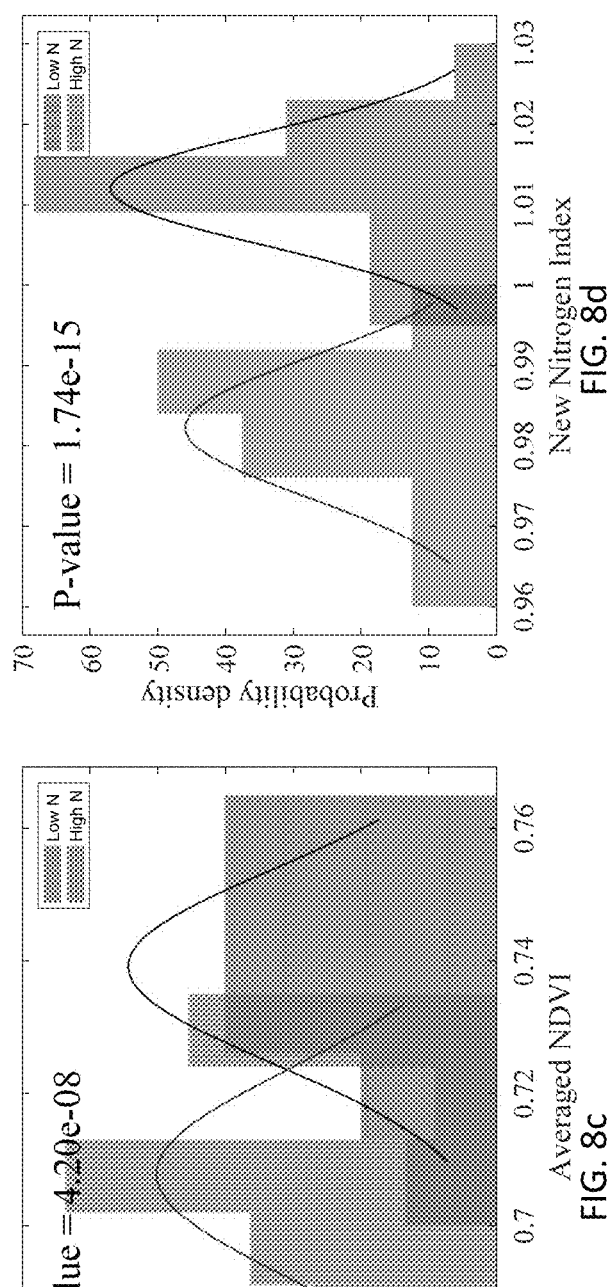
Figures 8E, 8F:
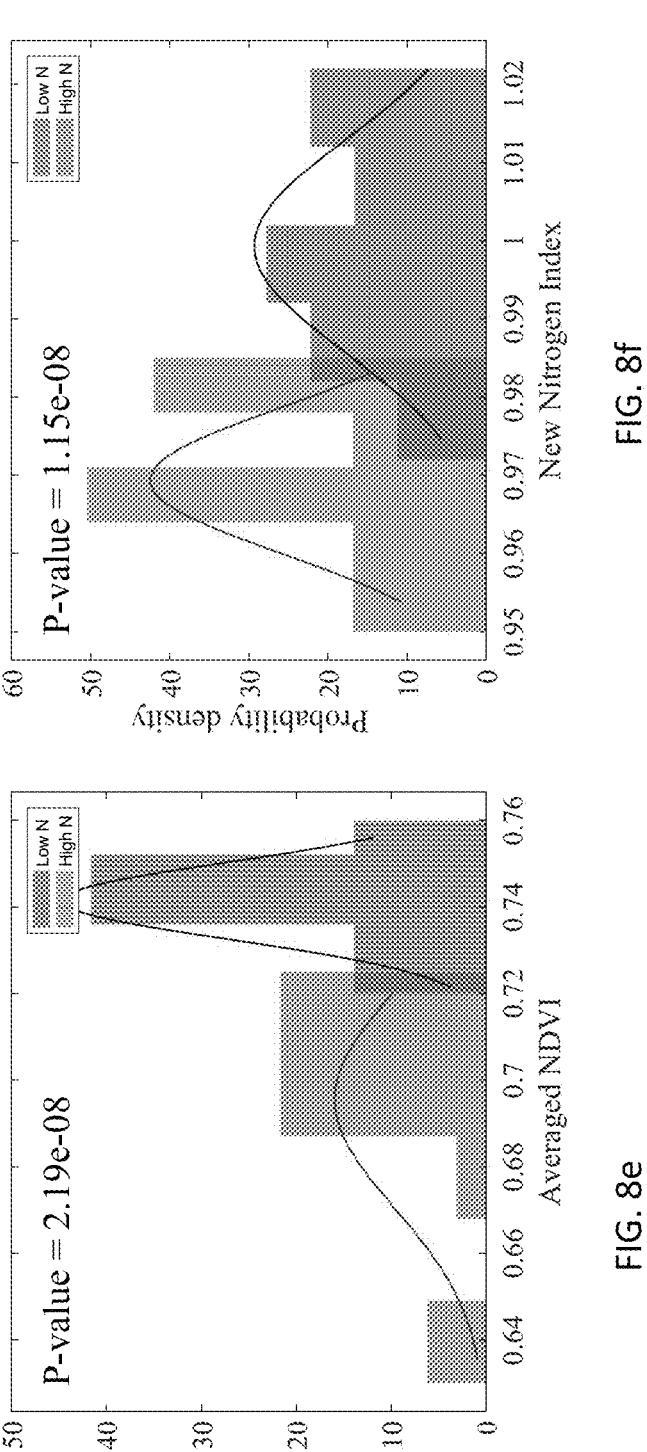

To evaluate the effectiveness of the NLCS-N, performances of Avg. NDVI and NLCS-N were first compared by checking their correlations between the reference nitrogen contents data. By fitting a linear model between each of the indices and the nitrogen contents values, their coefficient of determination ($R^2=1-RSS/TSS$, where RSS is sum of squares of residuals and TSS is total sum of squares), a well-known measure to compare curve-fit data with actual data, was used to compare the correlations which are shown in FIG. 7, which is a bar chart showing coefficient of determination ($R^2$) values between the whole-leaf averaged NDVI (Avg. NDVI) vs. nitrogen contents and the new nitrogen index (NLCS-N) vs. the nitrogen contents. It is well understood that $R^2$ values close to 1 represent a well-fit curve when compared to actual values, while $R^2$ values close to 0 represent a poor-fit curve when compared to actual values Specifically, for each set of bars (i.e., for both Avg. NDVI and NLCS-N) there are 16 plants, representing the population, where one leaf from each plant can be processed as discussed above or a plurality of leaves from each plant can be processed, and the results averaged. For each treatment condition listed, the nitrogen content was obtained in the laboratory, thus establishing the $R^2$ values. Treatment groups included well-watered Thorne (WW-TH), drought-stressed Thorne (DS-TH), well-watered Pioneer (WW-PN), and drought-stressed Pioneer (DS-PN). Overall, there were positive $R^2$ values for all models indicating positive correlations between the indices and the reference nitrogen contents. However, all the $R^2$ values of the NLCS-N were at least 31% higher than the Avg. NDVI, regardless of genotypes or irrigation treatments. Interestingly, the $R^2$ values of NLCS-N stayed above 0.5 steadily while having a peak value of above 0.7 in the DS-TH group. However, the $R^2$ values of Avg. NDVI dropped dramatically to lower than 0.4 in the WW-TH and DS-PN groups. The stable and high $R^2$ values indicated that the NLCS-N has higher robustness and a better correlation with the plant's nitrogen content than the Avg. NDVI.

Estimated probability density distributions of the Avg. NDVI and the NLCS-N are shown in FIGS. 8a-8f. Specifically, two-sample t-tests results and estimated probability density distribution plots of the whole-leaf averaged NDVI (Avg. NDVI) and the new nitrogen index (NLCS-N) are provided in FIGS. 8a-8f. Different treatment combinations including well-watered Thorne (WW-TH), drought-stressed Thorne (DS-TH), well-watered Pioneer (WW-PN), and drought-stressed Pioneer (DS-PN) are shown in these figures. The P-values of the two-sample T-test results between the high-nitrogen and low-nitrogen groups were labeled in each of the graphs. Across all four groups of plants, the NLCS-N had smaller P-values than the Avg. NDVI. This indicated that high and low-nitrogen plants, e.g., soybean plants, corn plants, and other plants, could be more clearly separated with the NLCS-N than using the Avg. NDVI. Similar trends are observed in the probability density distribution plots shown in these figures.

It is noted that when plants are under nitrogen deficiency, the limited nitrogen minerals will tend to be loaded more into the phloem and xylem tissues such as veins and the petiole of a leaf. Because nitrogen nutrients play important roles in regulating photosynthesis and the formulation of chlorophyll the result of nitrogen deficiency could emerge in the form of different chlorophyll distributions in the veins and mesophyll regions of a leaf, which eventually become the signal captured by NLCS-N.

Figure 9:
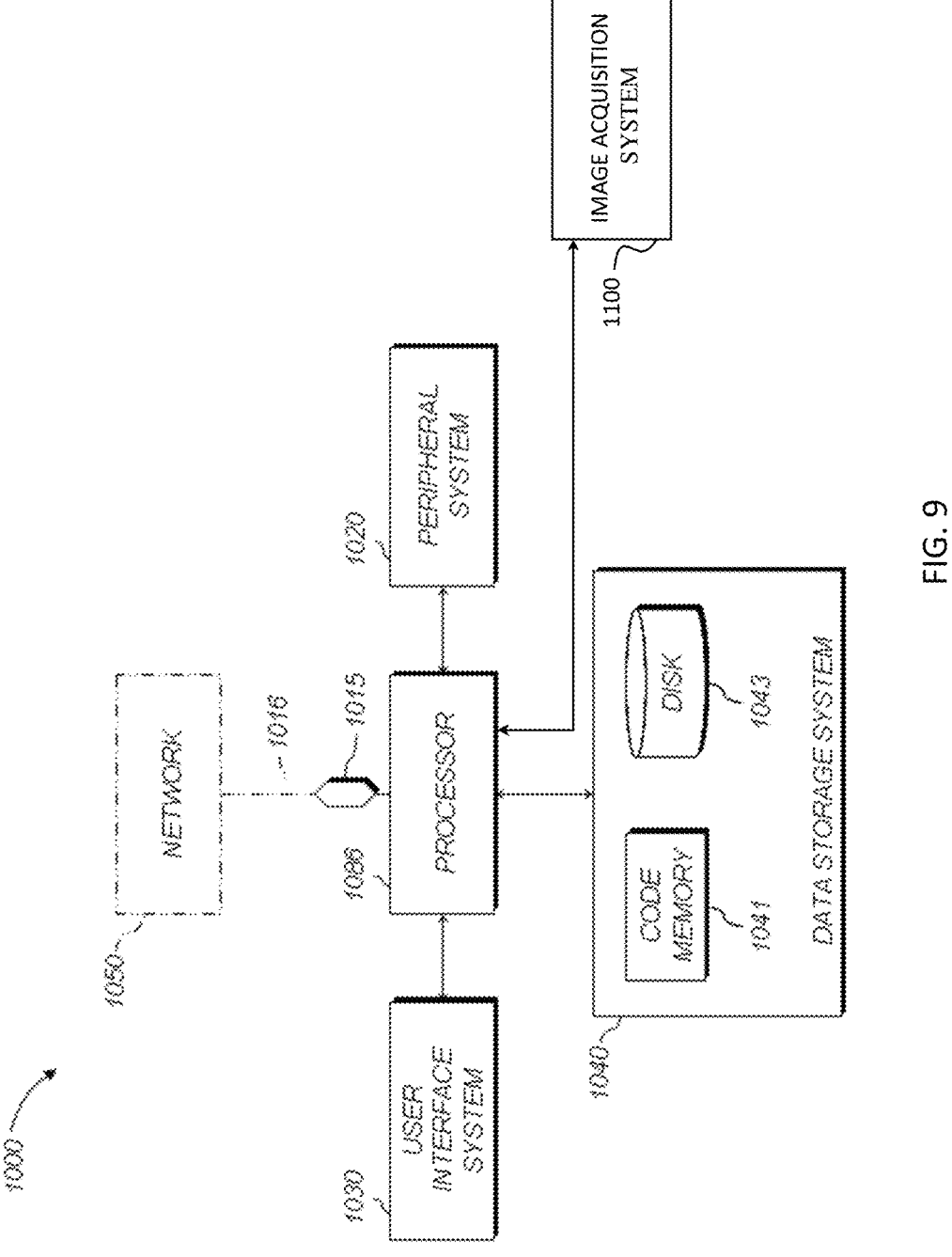
FIG. 9 is an example block diagram of a computer system that can interface with the external image acquisition system of FIG. 1, according to the present disclosure.

Referring to FIG. 9, an example of a computer system is provided that can interface with the above-discussed external image acquisition system, e.g., the IS 100 (see FIG. 1). Referring to FIG. 9, a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043.

Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

The processor 1086 is coupled to the external image acquisition system 1100, e.g., the IS 100. As discussed above with respect to FIG. 2, the processor communicates with the external image acquisition system 1100 in order to drive the external image acquisition system 1100, acquire image from a leaf, and obtain the acquired leaf image from the external image acquisition system 1100, as discussed above. The methods discussed herein are performed by software residing in non-transitory memory and which is controlled by the processor 1086.

Figure 10:
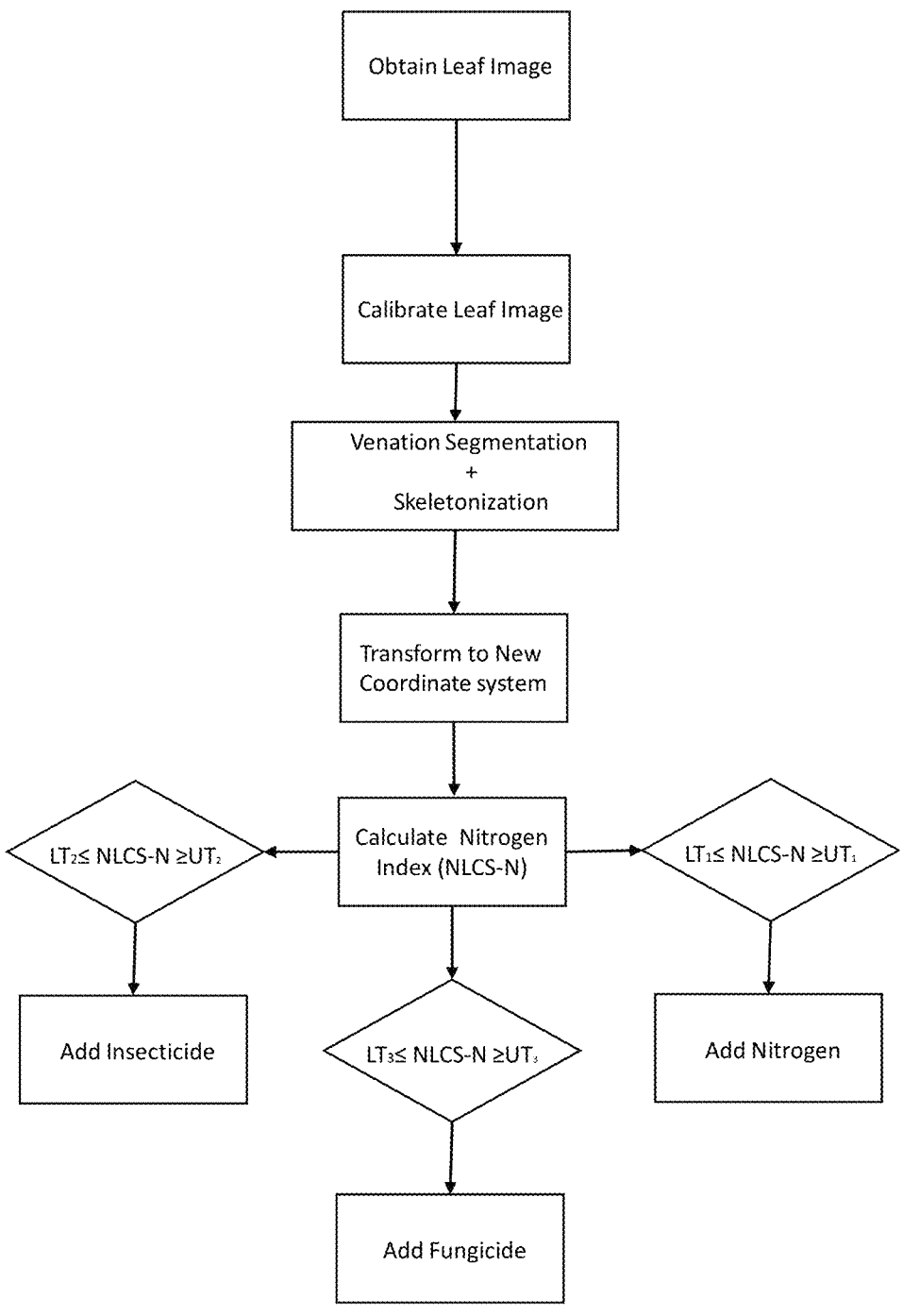
FIG. 10 is a flowchart of the operational steps, according to the present disclosure.

In operation, and with reference to FIG. 10 which is a flowchart of the operational steps discussed herein, the processor 1086 commands the external image acquisition system 1100 to obtain one or more images from a leaf that has been provided within the image chamber of the system 1100. These images are returned to the processor 1086 which as shown in FIG. 10 operates various functions on the one or more images. It should be noted that the processor 1086 and the remainder of the support blocks shown in FIG. 9, can all be provided within the external image acquisition system 1100 or outside in a separate unit.

Once the one or more images are acquired by the processor 1086, the processor 1086 may depending on the obtained images carry out a calibration process as discussed above. Next, the processor 1086 generates Venation Segmentation and Skeletonization, and thereby identify ridges and valleys of the leaf. Next, the processor 1086 identifies the average NDVI values between the ridges and valleys. Once the average NDVI values is known, the processor 1086 calculates the Nitrogen Index. If this calculated Nitrogen Index is between a first and a second thresholds, the processor 1086 communicates to a user the need to add various chemicals to the field.

Alternatively, the processor 1086 carries out a spectral calibration process on the acquired images (not shown), followed by identifying veins and mesophyll regions adjacent veins (not shown), followed by calculating a nitrogen stress index based on the identified mesophyll regions, i.e., pixels in the mesophyll regions. If this calculated Nitrogen Stress Index is between a first and a second thresholds, the processor 1086 communicates to a user the need to add various chemicals to the field.

Those having ordinary skill in the art will recognize that numerous modifications can be made to the specific implementations described above. The implementations should not be limited to the particular limitations described. Other implementations may be possible.

The invention claimed is:

1. A method for spatial analysis of leaf images, comprising:

acquiring one or more images from one or more leaves of one or more plants;

generating 3-dimensional (3D) images from the acquired one or more images from associated spectral heatmaps;

identifying a stem and a plurality of veins coupled to the stem in each generated 3D image;

identifying i) one or more of valleys and ridges as regions between two consecutive veins from the plurality of veins, or ii) one or more of peaks and valleys as regions between two consecutive veins from the plurality of veins in the one or more generated 3D images;

calculating average slopes in the generated 3D images between i) one or more of peak-to-valley, or ii) ridge-to-valley for each of the plurality of veins in each of the generated 3D images;

calculating a nitrogen index based on the calculated average slopes;

if the calculated nitrogen index is between two thresholds, communicate to a user to add a predetermined chemical to the one or more plants.

2. The method of claim 1, wherein the one or more images are selected from the group consisting of hyperspectral images (HSIs), multispectral images (MSIs), red-green-blue (RGB) images, and combinations thereof.

3. The method of claim 1, wherein the step of identifying one or more of valleys and ridges as regions between two consecutive veins from the plurality of veins including:

skeletonizing each of the acquired one or more images to thereby generate a skeletonized midrib, a plurality of skeletonized veins emanating from the skeletonized midrib, and generate a proximity map for each pixel in the acquired one or more images based on associated Euclidean distance of pixels between each of two neighboring veins and thereby associated each pixel to a vein of the plurality of veins.

4. The method of claim 3, prior to the step of skeletonizing each of the acquired one or more images, further comprising:

calibrating the acquired one or more images, and wherein the step of skeletonizing each of the one or more acquired images is replaced with skeletonizing the one or more calibrated images.

5. The method of claim 4, wherein the step of calibrating includes applying a spectral calibration to each of the acquired one or more images, to thereby generate associated spectral calibrated one or more images;

acquiring an image of a checkerboard;

autodetecting each rectangle in the acquired image of the checkerboard;

determining aspect ratio of each autodetected rectangle;

averaging the determined aspect ratio; and applying the averaged aspect ratio as a calibration vector to each of the associated spectral calibrated one or more images to thereby generate each of the associated calibrated one or more images.

6. The method of claim 1, wherein the step of calculating the average slope includes calculating the nitrogen index between ridges and valleys based on:

$$NLCS - N = \frac{1}{N}\sum_{i=1}^{N}\left[\frac{1}{L}\sum_{v=1}^{L}\left(\frac{NDVI_{mesophyll\_v}}{NDVI_{vein\_v}}\right)\right]$$

where N is number of veins of the plurality of veins, i is an index of the veins, at each $i^{th}$ vein, L represents number of pixels on said vein, $NDVI_{vein\_v}$ is calculated as the average NDVI values in the generated 3D images of veins when veins represent peaks next to mesophyll valleys and the average NDVI values of valleys when veins represent valleys next to a mesophyll ridges on both sides of the peaks or both sides of the valleys for each of the plurality of veins, and $NDVI_{mesophyll\_v}$ is calculated as the average NDVI values in the generated 3D images of mesophyll valleys associated with peak veins when veins represent peaks next to said mesophyll valleys and the average NDVI values of mesophyll ridges associated with valley veins when veins represent valleys next to said mesophyll ridges, and wherein $$NDVI = \frac{I_{NIR} - I_{RED}}{I_{NIR} + I_{RED}}$$

where $I_{NIR}$ and $I_{RED}$ are pixel intensities at wavelengths of near-infrared and red, respectively.

7. The method of claim 6, wherein NDVI is replaced with a nitrogen reflectance index (NRI), wherein $$NRI = (\lambda_{NIR}/\lambda_G)_{area\ of\ interest} / (\lambda_{NIR}/\lambda_G)_{Reference}$$

where $\lambda_{NIR}$ and $\lambda_G$ are near-infrared and green spectral bands, respectively.

8. The method of claim 6, wherein NDVI is replaced with an orange/red Chlorophyll Absorption Ratio (OCAR), wherein $$OCAR = \frac{I_{Orange}}{I_{Red}}$$

where $I_{Orange}$ is the orange intensity of a pixel, and $I_{Red}$ is the red intensity of the pixel.

9. The method of claim 6, wherein NDVI is replaced with a green/red Chlorophyll Absorption Ratio (GRAR), wherein $$GRAR = \frac{I_{Green}}{I_{Red}}$$

where $I_{Green}$ is the green intensity of a pixel, and $I_{Red}$ is the red intensity of the pixel.

10. The method of claim 1, wherein the one or more plants are soybean plants.

11. A method for spatial analysis of leaf images, comprising:

acquiring one or more images from one or more leaves of one or more plants;

identifying a stem and a plurality of veins coupled to the stem and mesophyll regions adjacent each vein of the plurality of veins in each acquired image;

calculating a nitrogen stress index based on spectral index values of pixels in the identified mesophyll regions; and if the calculated nitrogen stress index is between two thresholds, communicate to a user to add a predetermined chemical to the one or more plants.

12. The method of claim 11, wherein the one or more images are selected from the group consisting of hyperspectral images (HSIs), multispectral images (MSIs), red-green-blue (RGB) images, and combinations thereof.

13. The method of claim 12, further comprising:

calibrating the one or more acquired images.

14. The method of claim 13, wherein the step of calibrating includes applying a spectral calibration to each of the acquired one or more images, to thereby generate associated spectral calibrated one or more images.

15. The method of claim 11, wherein the step of calculating the nitrogen stress index includes:

$$NLCS - NS = \frac{1}{N}\sum_{i=1}^{N}\left[\frac{1}{L}\sum_{v=1}^{L}\left(\frac{NDVI_{mesophyll\_c}}{NDVI_{mesophyll\_v}}\right)\right]$$

where N is number of veins of the plurality of veins, i is an index of the veins, at each $i^{th}$ vein, L represents length of said vein, $NDVI_{mesophyll\_c}$ is related to Normalized Difference Vegetation Index (NDVI) values associated with the pixels about center of each mesophyll region, $NDVI_{mesophyll\_v}$ is related to NDVI values associated with the pixels adjacent veins in each mesophyll region, and wherein $$NDVI = \frac{I_{NIR} - I_{RED}}{I_{NIR} + I_{RED}}$$

where $I_{NIR}$ and $I_{RED}$ are pixel intensities at wavelengths of near-infrared and red, respectively.

16. The method of claim 15, wherein NDVI is replaced with a nitrogen reflectance index (NRI), wherein $$NRI = (\lambda_{NIR}/\lambda_G)_{area\ of\ interest} / (\lambda_{NIR}/\lambda_G)_{Reference}$$

where $\lambda_{NIR}$ and $\lambda_G$ are near-infrared and green spectral bands, respectively.

17. The method of claim 15, wherein NDVI is replaced with an orange/red Chlorophyll Absorption Ratio (OCAR), wherein $$OCAR = \frac{I_{Orange}}{I_{Red}}$$

where $I_{Orange}$ is the orange intensity of a pixel, and $I_{Red}$ is the red intensity of the pixel.

18. The method of claim 15, wherein NDVI is replaced with a green/red Chlorophyll Absorption Ratio (GRAR), wherein $$GRAR = \frac{I_{Green}}{I_{Red}}$$

where $I_{Green}$ is the green intensity of a pixel, and $I_{Red}$ is the red intensity of the pixel.

19. The method of claim 11, wherein the one or more plants are corn plants.

\* \* \* \* \*